United States Patent

Ito et al.

[11] Patent Number: 5,701,838
[45] Date of Patent: Dec. 30, 1997

[54] SHIFT LEVER DEVICE HOUSING

[75] Inventors: Hideaki Ito; Shigetoshi Tomida, both of Aichi-ken, Japan

[73] Assignee: Kabushiki Kaisha Tokai-Rika-Denki-Seisakusho, Aichi-ken, Japan

[21] Appl. No.: 552,759

[22] Filed: Nov. 3, 1995

[30] Foreign Application Priority Data

Nov. 11, 1994 [JP] Japan ................. 6-279217

[51] Int. Cl.$^6$ ................. G09F 11/00
[52] U.S. Cl. ................. 116/28.1; 116/323; 116/DIG. 20; 40/653
[58] Field of Search ................. 40/649, 650, 653; 116/28.1, 321, 322, 323, 324, 334, DIG. 20

[56] References Cited

U.S. PATENT DOCUMENTS 2,713,738  7/1955  Harman ................. 116/323
4,580,518  4/1986  Scanlon et al. ................. 116/28.1
5,540,180  7/1996  Kataumi et al. ................. 116/28.1

FOREIGN PATENT DOCUMENTS 61-9334  1/1986  Japan ................. 116/28.1

Primary Examiner—William A. Cuchlinski, Jr.
Assistant Examiner—Willie Morris Worth
Attorney, Agent, or Firm—Sixbey Friedman Leedom & Ferguson; Thomas W. Cole

[57] ABSTRACT

A shift lever device housing having a plate; an opening portion in said housing exposing a portion of a surface of the plate; a pair of guide rails provided at transverse opposite sides of the opening portion, each guide rail of the pair of guide rails guiding and supporting the plate which is inserted between the pair of guide rails along a longitudinal direction of the plate; and a guide member provided at a plate insertion side of the opening portion for supporting transverse end portions of the plate as the plate is inserted between the guide rails. The device prevents the portions of the plate exposed by the opening from becoming scratched during the insertion operation.

20 Claims, 6 Drawing Sheets

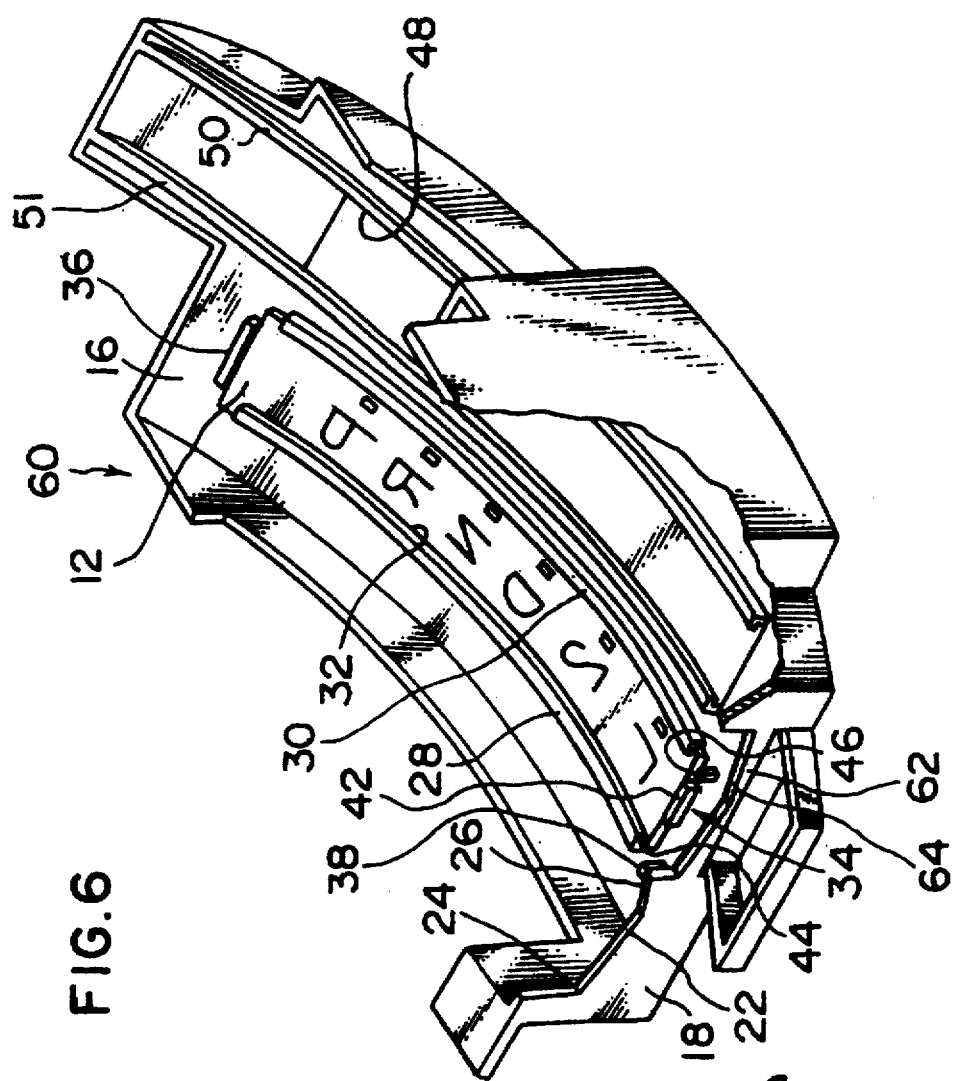
FIG.6
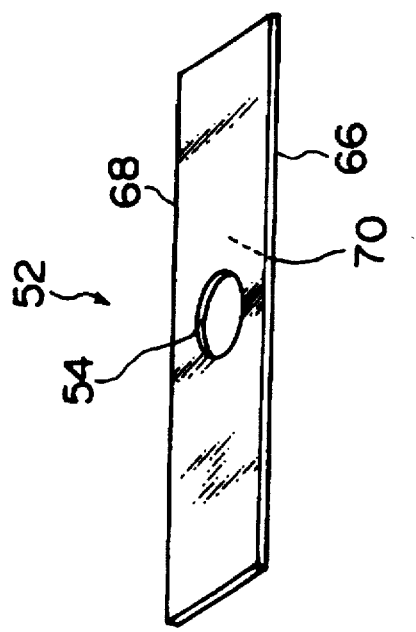

SHIFT LEVER DEVICE HOUSING

BACKGROUND OF THE INVENTION

1. Field of the Invention

The present invention relates to a shift lever device housing for a shift lever disposed in, for example, a vehicle.

2. Description of the Related Art

Among shift lever devices for shifting the transmission of an automobile, in shift lever devices used for automatic transmissions, a driver can arbitrarily select a transmission mode from a plurality of transmission modes by operating a shift lever.

In such a shift lever device, the selected transmission mode can be visually confirmed by indication windows and characters indicating the shift positions which characters are on an indicator plate provided on an upper housing at the side of the shift lever. The indicator plate is usually formed by a transparent member, e.g., a polycarbonate sheet or the like. The entire surface of the indicator plate is printed opaque except for the characters indicating the shift ranges and portions of the indication surface corresponding to the indication windows which correspond to the shift ranges. Thereafter, the characters indicating the shift ranges are printed translucent. The indicator plate is mounted and fixed to the interior portion of the upper housing.

A sliding cover is provided so that, when the shift lever is operated by the driver, no foreign objects enter into the opening portion of the upper housing through which the shift lever passes. Usually, the sliding cover is formed from a relatively soft resin plate member of the same color as the upper housing, and is mounted in the upper housing so as to be able to move together with the shift lever.

An example of a structure for fixing the indicator plate and the sliding cover to the interior portion of the upper housing is illustrated in FIG. 7.

The upper housing 100 illustrated in FIG. 7 is formed integrally by, for example, ABS resin or the like. The upper housing 100 is fixed on the plate of the floor surface of the vehicle such that what is the reverse surface of a bottom wall 102 in the figure can be seen by the driver, i.e., the top and bottom as illustrated in the figure are the opposite of what they are when the structure is put into actual use in a vehicle.

The upper housing 100 has various configurations in accordance with various types of automobiles. Usually, the bottom wall 102 is planar or is a curved surface forming a substantial box-shape. The bottom wall 102 of the upper housing 100 illustrated in the figure is a curved surface.

An opening portion 110 is formed in the bottom wall 102. The configuration of the opening portion 110 corresponds to an indication surface 112 of an indicator plate 104 so that the indication surface 112 can be visually confirmed by the driver.

A pair of guide rails 106,108 are provided at the sides of the opening portion 110 so as to correspond to the configuration of the indicator plate 104. The guide rails 106, 108 respectively have an L-shaped cross-section and oppose each other. The guide rails 106,108 are shaped so as to be able to hold the indicator plate 104. When the indicator plate 104 is to be mounted to the interior portion of the upper housing 100, the indicator plate 104 is inserted along the guide rails 106,108 so as to be guided and held thereby.

Stoppers 114, 116 are formed in vicinities of the longitudinal direction end portions of the opening portion 110. When the indicator plate 104 is inserted in the guide rails 106,108 and reaches a predetermined position, the indicator plate 104 is fixed by the stoppers 114, 116 so that there is no displacement of the indicator plate 104 in the longitudinal direction. Namely, the indicator plate 104 is fixed by the guide rails 106, 108 and by the stoppers 114, 116. In this fixed state, the indicator plate 104 does not move in either the longitudinal direction or the vertical direction.

An opening portion 136 is formed at the side of the guide rail 108. A pair of guide rails 142, 144 are provided at the sides of the opening portion 136. The guide rails 142, 144 respectively have an L-shaped cross-section and oppose each other. The guide rails 142, 144 are shaped so as to be able to hold a sliding cover 138. An opening portion 146 is formed in the central portion of the sliding cover 138. An unillustrated shift lever passes through the opening portion 146 and the opening portion 136. The sliding cover 138 is interlocked with the shift lever and slides along the guide rails 142, 144.

In the conventional upper housing 100, when the indicator plate 104 is to be mounted to the interior portion of the upper housing 100, first, the indicator plate 104 passes a side wall 124 of the upper housing 100 and passes the stopper 114. The indicator plate 104 is directed toward the lower end portions 130, 132 of the guide rails 106, 108, and is advanced downward at an angle. An end portion 134 of the indicator plate 104 engages the lower end portions 130, 132 of the guide rails 106,108, and thereafter, the indicator plate 104 is slid until the end portion 134 thereof contacts the stopper 116.

However, in the conventional upper housing 100, when the indicator plate 104 passes the side wall 124 immediately after the beginning of insertion thereof, in cases in which the indication surface 112 of the indicator plate 104 contacts a top portion 126 of the side wall 124, the indication surface 112 of the indicator plate 104 is scratched. Further, after the final end of the indicator plate 104 passes the side wall 124, in cases in which the indication surface 112 of the indicator plate 104 contacts a top portion 128 of the stopper 114, the indication surface 112 of the indicator plate 104 is scratched.

In order to have the indication surface 112 of the indicator plate 104 not contact the top portion 126 of the side wall 124 and the top portion 128 of the stopper 114, the insertion angle θ of the indicator plate may be made large as illustrated in FIGS. 8 and 9. Namely, a worker may raise the indicator plate 104 to as high of a position as possible, as illustrated by the dotted line portion 104A, and insert the indicator plate 104.

However, in this case, the worker must pay much attention so that the indication surface 112 of the indicator plate 104 does not contact the top portion 126 of the side wall 124 and the top portion 128 of the stopper 114. Therefore, work efficiency in the mounting process deteriorates. Further, because raising the indicator plate 104 to as high of a position as possible means bending the indicator plate 104 further, a material having the elasticity to be able to withstand this bending must be selected. As a result, the range of selection of materials becomes narrow, which results in an increase in costs.

By making the height of the side wall 124 as low as possible, it is possible to obtain a configuration in which the indication surface 112 of the indicator plate 104 and the top portion 128 of the side wall 124 do not contact, without making the angle of entry θ large. However, in this case, not only is the design of the upper housing restricted, but also, after the final end of the indicator plate 104 has passed the side wall 124, there is the possibility that the indication surface 112 of the indicator plate 104 will contact the top portion 128 of the stopper 114. In this case, the drawback of the scratching of the indication surface 112 is not resolved.

There also exists a method of forming the indicator plate 104 integrally with the bottom wall 102 of the upper housing 100 by insert forming. However, in this case, the cost increases as special processes are required.

The same drawbacks occur when the sliding cover 138 is mounted in the upper housing 100 as well. When the sliding cover 138 passes a side wall 140 immediately after the beginning of insertion of the sliding cover 138, the surface of the sliding cover 188 contacts a top portion 141 of the side wall 140 and is scratched.

SUMMARY OF THE INVENTION

In view of the aforementioned, an object of the present invention is to provide a shift lever device housing in which, when an indicator plate and a sliding cover are mounted to the interior portion of an upper housing, scratching of an indication surface of the indicator plate and scratching of a surface of the sliding cover can be prevented, and which can be realized at a low cost without deteriorating the work efficiency of the processes for mounting the injector plate and the sliding cover.

A first aspect of the present invention is a shift lever device housing comprising: a plate; an opening portion exposing a portion of a surface of the plate; a pair of guide rails provided at transverse opposite sides of the opening portion, each guide rail of the pair of guide rails guiding and supporting the plate which is inserted into the pair of guide rails from one longitudinal direction end portion of the plate; and a guide member provided at a plate insertion side of the opening portion. When the plate is inserted, the guide member supports transverse opposite end portions of the plate which are unexposed portions of the surface of the plate so that the exposed portion does not become scratched.

A second aspect of the present invention is a shift lever device housing comprising: an indicator plate; an opening portion exposing an indication surface of the indicator plate to an exterior; a pair of guide rails provided at transverse opposite sides of the opening portion, each guide rail of the pair of guide rails guiding and supporting the indicator plate which is inserted into the pair of guide rails from one longitudinal direction end portion of the indicator plate; a stopper provided in a vicinity of an indicator plate insertion side end portion of the opening portion, the stopper, together with the pair of guide rails, supporting the indicator plate; a guide wall provided at an indicator plate insertion side of the stopper, the guide wall supporting transverse opposite end portions of the indicator plate other than the indication surface of the indicator plate; and a supporting member provided between the guide wall and the stopper, the supporting member being provided such that, when the indicator plate is inserted, there exists a gap between the indicator plate and the stopper. The supporting member supports the transverse opposite end portions of the indicator plate that does not include the indication surface of the indicator plate as the plate is inserted between the guide rails.

A third aspect of the present invention is a shift lever device housing comprising: a sliding cover moving together with a shift lever; an opening portion exposing a portion of a surface of the sliding cover to an exterior; a pair of guide rails provided at transverse opposite sides of the opening portion, each guide rail of the pair of guide rails slidably supporting the sliding cover which is inserted into the pair of guide rails from a longitudinal direction end portion of the sliding cover; and a guide wall provided at a sliding cover insertion side of the opening portion. When the sliding cover is inserted, the guide wall supports transverse opposite end portions of the sliding cover which are unexposed portions of the surface of the sliding cover so that the exposed portions are not scratched.

In the shift lever device housing of the first aspect, when the plate is inserted, only the transverse opposite end portions of the plate are supported by the guide member. The plate is inserted into the guide rails with a gap being maintained under the portion of the surface which is exposed from the opening portion.

In this way, in the shift lever device housing of the first aspect, the plate is inserted and fixed in the housing without the surface being scratched due to contact with regions of the housing.

In the shift lever device housing of the second aspect of the present invention, when the indicator plate is inserted, only the transverse direction end portions of the indicator plate other than the indication surface are supported by the guide wall. The indicator plate is guided to the guide rails with the gap between the indication surface and the guide wall being maintained. Further, the transverse opposite end portions of the indicator plate other than the indication surface are supported by the supporting member, and the indicator plate is inserted in the guide rails with the gap between the indication surface and the stopper being maintained.

In this way, in the shift lever housing device of the second aspect, the indicator plate is inserted and fixed in the housing without the indicator surface or the surface being scratched due to contact with other regions such as the stopper or the like.

In the shift lever housing of the third aspect of the present invention, the transverse opposite end portions of the sliding cover are supported by the guide wall. The sliding cover is guided to the guide rails with the gap between the surface and the guide wall being maintained. The sliding cover is inserted into the guide rails with the gap at the surface being maintained.

In this way, in the shift lever device housing of the third aspect, the sliding cover is inserted and disposed in the housing without the surface being scratched due to contact with the side wall.

BRIEF DESCRIPTION OF THE DRAWINGS

FIG. 6 is a partially broken perspective view illustrating a structure of an upper housing relating to a second embodiment of the present invention.

BRIEF DESCRIPTION OF THE PREFERRED EMBODIMENTS

Figure 1:
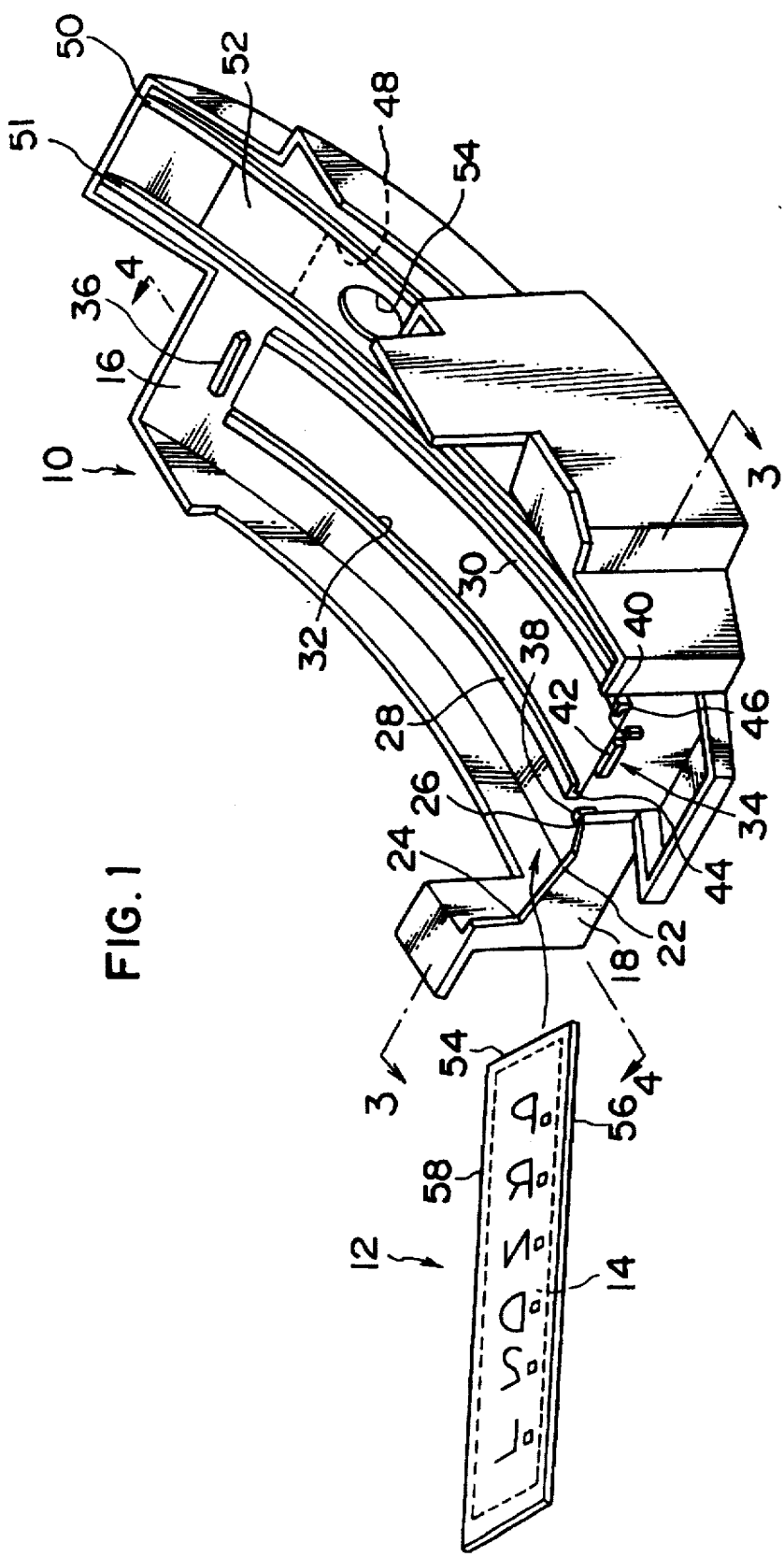
FIG. 1 is a perspective view illustrating a structure of an upper housing relating to a first embodiment of the present invention.

An upper housing 10 is formed integrally in a substantial box-shape by, for example, ABS resin. The entire surface of an indication plate 12 is printed opaque except for characters indicating the shift ranges, which are the transmission modes of a transmission of a vehicle, and except for portions of an indication surface 14 (which is the portion within the dotted line in the drawing) which portions correspond to the indication windows corresponding to the shift ranges. Thereafter, the portions which are the characters indicating the shift ranges are printed translucent.

A rectangular opening portion 32 is formed in a bottom wall 16 of the upper housing 10. The opening portion 32 is shaped so as to correspond to the indication surface 14 of the indicator plate 12, which serves as a plate, so that the indication surface 14 of the indicator plate 12 can be visually confirmed by a driver.

A pair of guide rails 28, 30 are provided in the longitudinal direction at transverse opposite sides of the opening portion 32 so as to receive of the indicator plate 12. The guide rails 28, 30 respectively have an L-shaped cross-section and are parallel to each other. The combination of the guide rails 28, 30 and side edges of the opening portion 32 are able to hold the indicator plate 12 over the opening portion 32. The indicator plate 12 is inserted into lower end portions 44, 46 of the guide rails 28, 30 and is guided by the guide rails 28, 30.

Stoppers 34, 56 are formed in vicinities of the longitudinal direction end portions of the opening portion 32. When the indicator plate 12 is inserted into the guide rails 28, 30 and reaches a predetermined position, the indicator plate 12 is fixed by the stoppers 34, 36 so as to not move in the longitudinal direction. Namely, the indicator plate 12 is fixed by the guide rails 28, 30 and by the stoppers 24, 36 such that the indicator plate 12 does not move in the transverse direction nor in the longitudinal direction.

Figure 2:
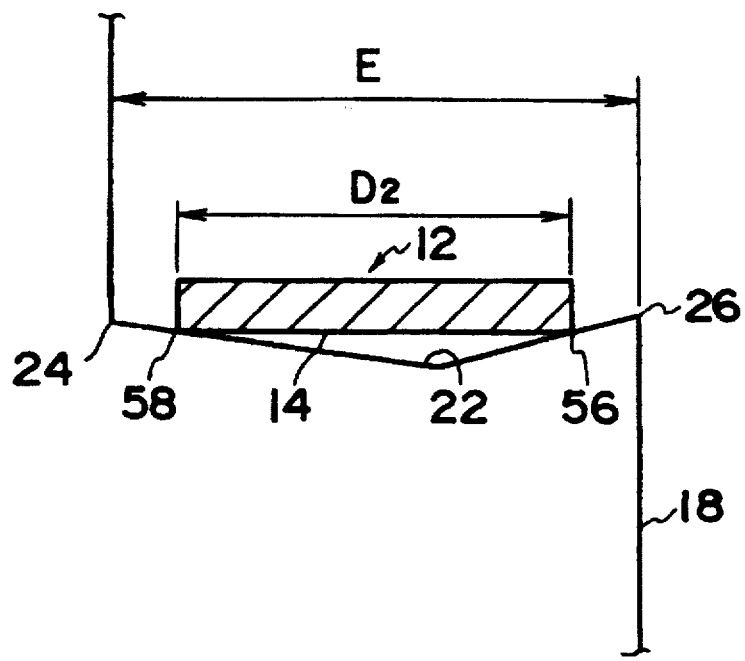
FIG. 2 is a front view illustrating details of a guide wall provided at the upper housing relating to the first embodiment of the present invention.

A guide wall 18 is provided at the indicator plate insertion side of the stopper 24. As illustrated in FIG. 2, a substantially V-shaped cut-out portion 22 is formed in the top portion of the guide wall 18. A cut-out width E between an end portion 24 and an end portion 28 of the cut-out portion 22 is set to be greater than a width $D_2$ of the indicator plate 12. The cut-out portion 22 supports transverse end portions 56, 58 of the indicator plate 12 such that a gap between the cut-out portion 22 and the indication surface 14 of the indicator plate 12 is maintained.

Figure 3:
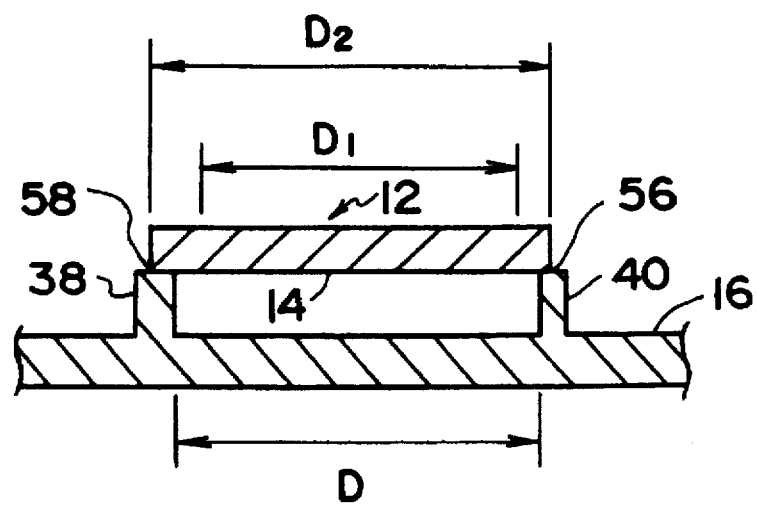
FIG. 3 is a sectional view taken along line 3—3 of FIG. 1 and illustrating projections provided at the upper housing relating to the first embodiment of the present invention.
Figure 4:
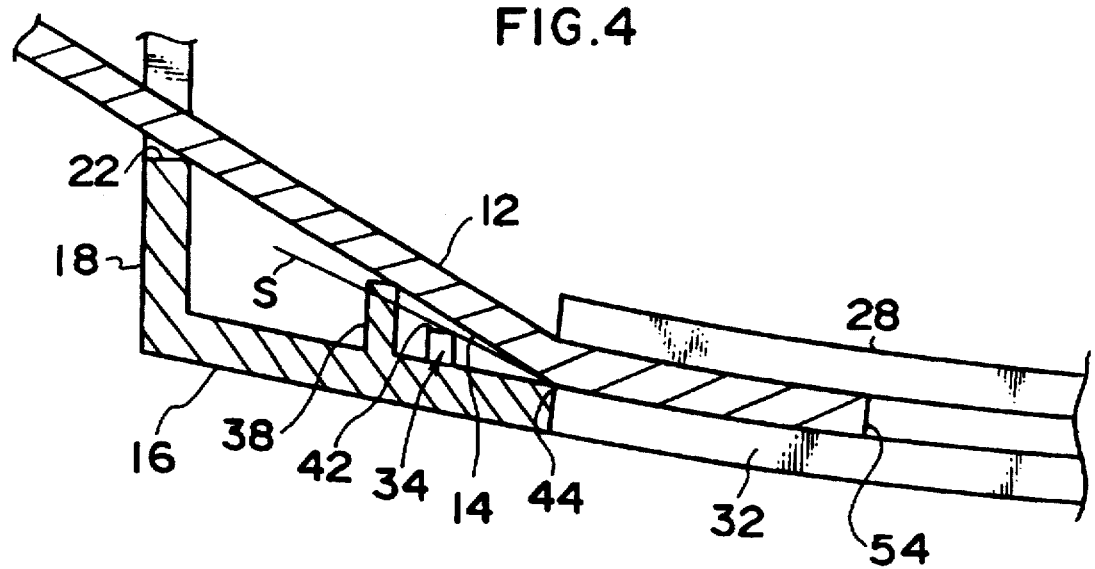
FIG. 4 is a sectional view taken along line 4—4 of FIG. 1 and illustrating the beginning of insertion of an indicator plate into the upper housing relating to the first embodiment of the present invention.

Projections 38, 40 are formed at the bottom wall 16 between the stopper 34 and the guide wall 18. As illustrated in FIG. 3, an interval D between the projection 38 and the projection 40 is set greater than a width $D_1$ of the indication surface 14 of the indicator plate 12 and is set smaller than the width $D_2$ of the indicator plate 12, such that the projections 38, 40 support the transverse direction end portions 56, 58 of the indicator plate 12. The projections 38, 40 maintain the gap between the indication surface 14 of the indicator plate 12 and the stopper 34. Therefore, as illustrated in FIG. 4, the projection 38 is set higher than an extension of a line S connecting a top edge portion 42 of the stopper 34 and the lower end portion 44 (i.e., the end portion of the opening portion 32 at the side at which the indicator plate 12 is inserted) of the guide rail 28. Further, in the same way as the projection 38, the projection 40 is set higher than an extension of a line S connecting the top edge portion 42 of the stopper 34 and the lower end portion 46 of the guide rail 30. The respective heights of the projections 38, 40 are equal.

A rectangular opening portion 48 is formed at the side of the guide rail 30. A pair of guide rails 50, 51 are provided in parallel along transverse opposite sides of the opening portion 48 so as to correspond to the configuration of a sliding cover 52 which serves as a plate. The guide rails 50, 51 respectively have an L-shaped cross-section and oppose each other. The guide rails 50, 51 in combination with the transverse side edges of opening portion 48 are able to hold a sliding cover 52 interlocked with a shift lever (unillustrated). An opening portion 54 is formed in the central portion of the sliding cover 52. The shift lever passes through the opening portion 54 and the opening portion 48. The sliding cover 52 inserted into the guide rails 50, 51 is guided by the guide rails 50, 51 and is slidably held thereby.

The upper housing 10 having the above-described structure is fixed on the plate of a floor surface of a vehicle such that, after the indicator plate 12 and the sliding cover 52 have been inserted, the indication surface 14 of the indicator plate 12 can be visually confirmed by the driver, i.e., the top and bottom as illustrated in the figure are the opposite of what they are when the structure is put into actual use in a vehicle.

Operation of the first preferred embodiment will be described hereinafter.

As illustrated in FIGS. 1 and 4, when the indicator plate 12 is to be inserted into the guide rails 28, 30, while the transverse opposite end portions 56, 58 of the indicator plate 12 other than the indication surface 14 of the indicator plate 12 are supported by the top portion of the guide wall 18 in which the substantially V-shaped cut-out portion 22 is formed, the end portions 58, 58 are guided by the guide rails 28, 30. At this time, because a gap is maintained between the indication surface 14 of the indicator plate 12 and the top portion of the guide wall 18, the indication surface 14 of the indicator plate 12 is guided to the lower end portions 44, 48 of the guide rails 28, 30 without contacting the top portion of the guide wall 18.

Figure 5:
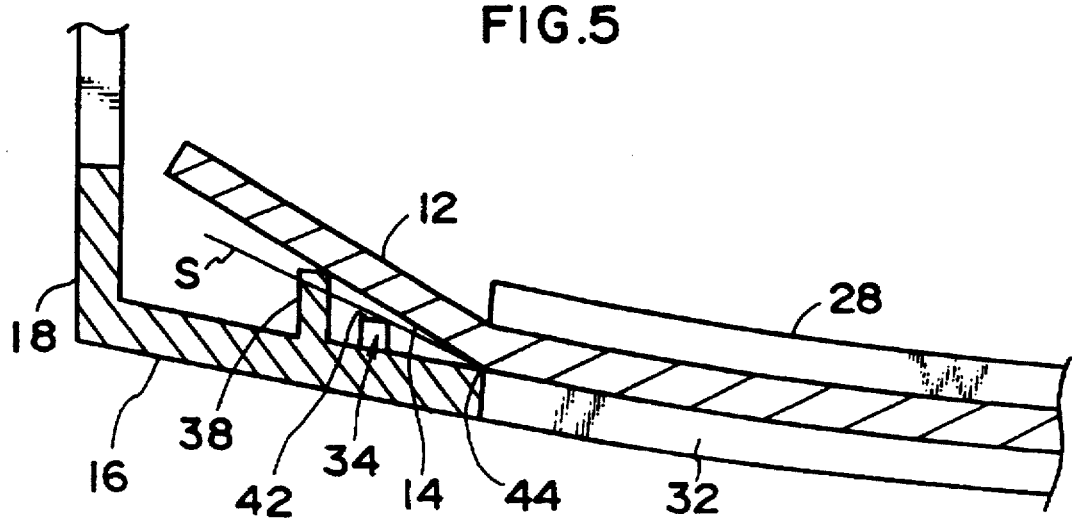
FIG. 5 is a sectional view corresponding to FIG. 4 and illustrating a state after a final end of the indicator plate has passed the guide wall, in the upper housing relating to the first embodiment of the present invention.
Figure 7:
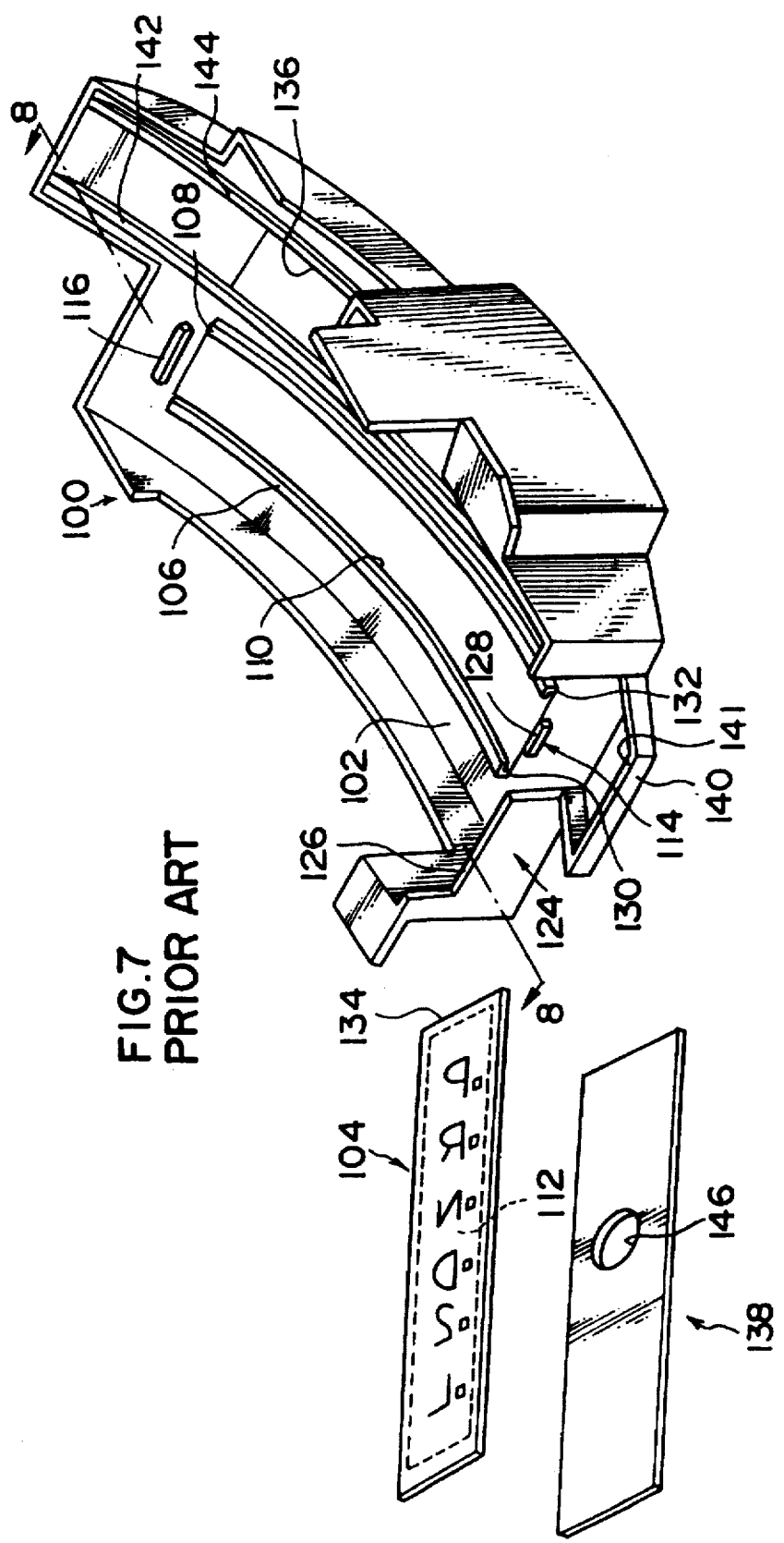
FIG. 7 is a perspective view illustrating a structure of a conventional upper housing.
Figure 8:
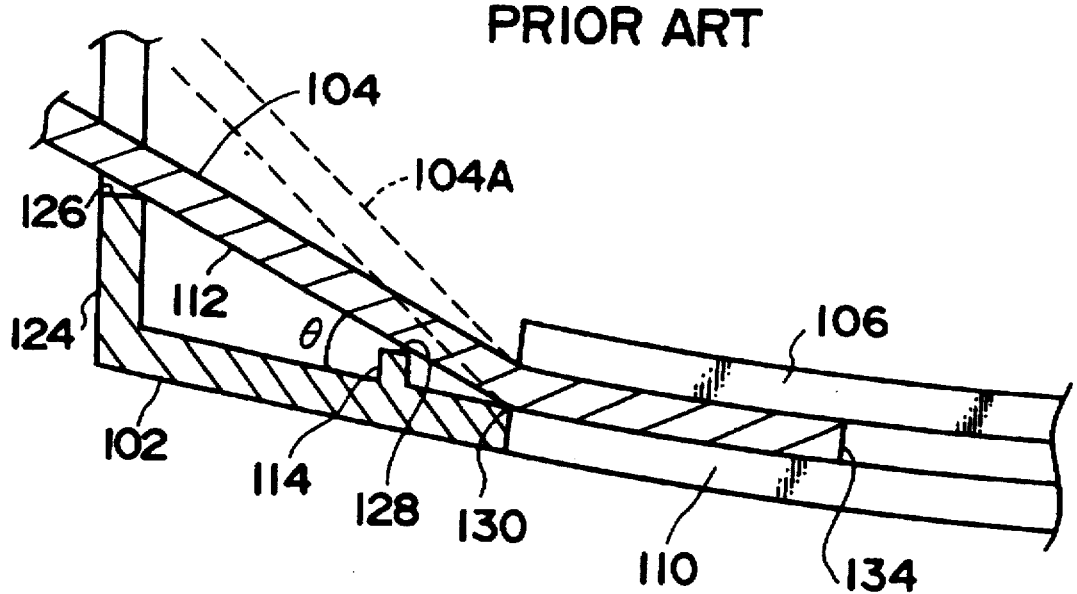
FIG. 8 is a sectional view taken along line 8—8 of FIG. 7 and illustrating the beginning of insertion of an indicator plate into the conventional upper housing.
Figure 9:
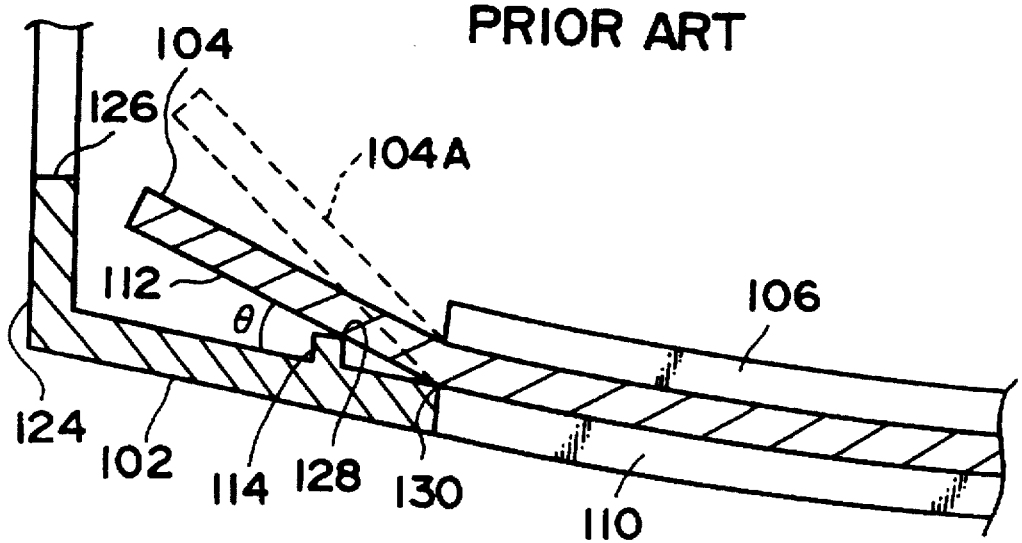
FIG. 9 is a sectional view corresponding to FIG. 8 and illustrating a state after a final end of the indicator plate has passed a guide wall, in the conventional upper housing.

Next, the indicator plate 12 which has passed the top portion of the guide wall 18 passes above the top edge portion 42 of the stopper 34 as illustrated in FIG. 5.

In this case, the indicator plate 12 is inserted into the guide rails 28, 30 while the transverse opposite end portions 56, 58 of the indicator plate 12 other than the indication surface 14 are supported by the projections 38, 40 provided between the guide wall 18 and the stopper 34 as described previously. The projections 38, 40 are set to be higher the extensions of lines S which connect the top edge portion 42 of the stopper 34 with the lower end portions 44, 46 of the guide rails 28, 30 opposing the projections 38, 40, respectively, so that the indication surface 14 of the indicator plate 12 does not contact the top edge portion 42 of the stopper 34. Accordingly, the gap between the indication surface 14 of the indicator plate 12 and the top edge portion 42 of the stopper 34 can be maintained, and the indicator plate 12 is inserted into the guide rails 28, 30 without the indication surface 14 contacting the stopper 34.

When the indicator plate 12 inserted into the guide rails 28, 30 is inserted to a predetermined position, a leading end portion 54 of the indicator plate 12 abuts the stopper 36. The indicator plate 12 is fixed by the guide rails 28, 30 and by the stoppers 34, 36 so as to not move in the longitudinal direction nor in the transverse direction.

In this way, at the upper housing 10 relating to the present embodiment, when the indicator plate 12 is inserted into the guide rails 28, 30, the gap between the indication surface 14 of the indicator plate 12 and the guide wall 18, and the gap between the indication surface 14 and the stopper 34 are maintained. Therefore, the indicator plate 12 can be inserted into the guide rails 28, 30 without being scratched due to contact of the indication surface 14 of the indicator plate 12 with the guide wall 18 and contact of the indication surface 14 with the stopper 34.

In the process for mounting the indicator plate 12 to the upper housing 10, the worker carries out his/her work with the indicator plate 12 being supported by the guide wall 18 and the projections 38, 40. Therefore, there is no need for the worker to pay an excessive amount of attention to raising the indicator plate 12 or the like, and there is no deterioration in work efficiency.

Further, the gap formed between the indication surface 14 of the indicator plate 12 and the top edge portion 42 of the stopper 34 can be determined by the height of the projections 38, 40. Therefore, the increase in the angle of entry can be kept to a minimum by making the gap as small as possible. Accordingly, the material for the indicator plate 12 can be selected in the same way as the prior art, and the indicator plate 12 can be manufactured at a low cost.

It suffices merely to provide the substantially V-shaped cut-out portion 22 in the guide wall 18 and to provide the projections 38, 40 at the bottom wall 16. Therefore, the upper housing 10 can be manufactured by the same processes as the conventional upper housing, and the cut-out portion and the projections can be provided in conventional upper housings. Accordingly, the upper housing 10 can be realized at a low cost.

In the first preferred embodiment, the cut-out portion 22 is substantially V-shaped. However, any configuration suffices which maintains the gap between the indication surface 14 of the indicator plate 12 by supporting the transverse direction end portions 56, 58 of the indicator plate 12. For example, the cut-out portion 22 may be a curved surface, or it is possible for only the portion thereof corresponding to the width $D_1$ of the indication surface 14 of the indicator plate 12 to be cut-out in a rectangular shape. In these cases as well, because a space is formed between the indication surface 14 of the indicator plate 12 and the top portion of the guide wall 18, the same effects as those of the first preferred embodiment are achieved.

Next, a second preferred embodiment of the present invention will be described. Portions which are fundamentally the same as those of the first preferred embodiment are denoted by the same reference numerals, and description thereof is omitted.

FIG. 6 is a partially broken perspective view of an upper housing 60 relating to the second preferred embodiment of the present invention.

In the same way as in the first preferred embodiment, the opening portion 32, the guide rails 28, 30 and the stoppers 34, 36 are provided at the upper housing 60. The indicator plate 12 is fixed by the guide rails 28, 30 and the stoppers 34, 36 so as to not move in the transverse direction nor in the longitudinal direction. Further, the guide wall 18 is provided at the indicator plate insertion side of the stopper 34 in the same way as in the first preferred embodiment.

The opening portion 48 is formed at the side of the guide rail 30. The pair of guide rails 50, 51 are provided parallel in the longitudinal direction at the transverse direction end portions of the opening portion 48. The guide rails 50, 51 respectively have an L-shaped cross-section and oppose each other. The guide rails 50, 51 are shaped so as to be able, in combination with side edges of the opening portion 48, to hold the sliding cover 52 which is interlocked with a shift lever (unillustrated). The opening portion 54 is formed in the central portion of the sliding cover 52. The shift lever passes through the opening portion 54 and the opening portion 48 of the upper housing 60. The sliding cover 52 inserted into the guide rails 50, 51 is guided and slidably held thereby.

A guide wall 62 is provided at the sliding cover insertion side of the opening portion 48. In the same way as the guide wall 18, a substantially V-shaped cut-out portion 64 is formed in the upper portion of the guide wall 62. The cut-out width of the cut-out portion 64 is set greater than the width of the sliding cover 52. The cut-out portion 64 supports transverse direction end portions 66, 68 of the sliding cover 52 when the sliding cover 52 is inserted, such that a gap is maintained between the cut-out portion 64 and a surface 70 of the sliding cover 52.

After the indicator plate 12 and the sliding cover 52 have been inserted, the upper housing 60 having the above-described structure is fixed on the plate of a floor surface of a vehicle such that the indication surface 14 or the indicator plate can be visually confirmed by the driver, i.e., the top and bottom as illustrated in the figure are the opposite of what they are when the structure is put into actual use in a vehicle.

Not only does the upper housing 60 relating to the second preferred embodiment have the same operation and effects as those of the upper housing 10 of the first preferred embodiment, but also, when the sliding cover 52 is inserted into the guide rails 50, 51, the guide wall 62 guides the sliding cover 52 to the guide rails 50, 51 without scratching the surface 70 of the sliding cover 52.

Namely, when the sliding cover 52 is inserted, the sliding cover 52 is guided to the guide rails 51, 52 by the guide wall 62 in which the substantially V-shaped cut-out portion 64 is formed, such that the cut-out portion 64 supports the transverse direction end portions 66, 68 of the sliding cover 52. At this time, because the gap between the surface 70 of the sliding cover 52 and the guide wall 62 is maintained, the sliding cover 52 is guided to the guide rails 51, 52 without the surface 70 contacting the top portion of the guide wall 62. Accordingly, when the sliding cover 52 is inserted, the sliding cover 52 is inserted into the guide rails 50, 51 with the end portions 66, 68 supported by the substantially V-shaped cut-out portion 64 of the guide wall 62. Therefore, the surface 70 of the sliding cover 52 does not contact any region of the upper housing 60, and is not scratched.

In the second preferred embodiment as well, the cut-out portion 64 is V-shaped. However, in the same way as in the first preferred embodiment, any configuration suffices which maintains the gap between the surface of the sliding cover 52 by supporting the transverse direction end portions 66, 68 of the sliding cover 52. For example, the cut-out portion 64 may be a curved surface, or it is possible for only the portion thereof corresponding to the width of the surface of sliding cover 52 to be cut-out in a rectangular shape. In these cases as well, because a space is formed between the surface of the sliding cover 52 and the top portion of the guide wall 62, the same effects as those of the second preferred embodiment are achieved.

The shift lever device housing relating to the present invention achieves the following effects.

In the shift lever device housing of the first aspect of the present invention, the plate can be inserted and disposed within the housing without the surface being scratched due to contact with regions of the housing during insertion of the plate.

In the process for mounting the plate, the worker carries out his/her work with the plate supported by the guide wall and the projections. Therefore, the worker does not need to pay excessive attention to raising the plate or the like, and there is no deterioration in work efficiency.

Moreover, the shift lever device housing of the first aspect can be realized merely by providing the guide member, and can be realized at a low cost because the housing can be manufactured by the same processes as conventional housings.

In the shift lever device housing of the second aspect of the present invention, the insertion plate can be fixed to the housing interior without the indication surface being scratched due to contact with a stopper or the like during insertion of the indicator plate.

In the process for mounting the indicator plate, the worker carriers out his/her work with the indicator plate supported by the guide wall and the supporting members. Therefore, the worker need not pay excessive attention to raising the indicator plate or the like, and work efficiency does not deteriorate.

The gap formed between the indication surface and the top edge portion of the stopper is determined by the height of the supporting members. Therefore, the increase in the angle of entry can be kept to a minimum by holding the gap to a minimum. Accordingly, the same materials as those of the conventional art can be selected for the indicator plate, so that there is no increase in cost.

The shift lever device housing of the second aspect can be realized merely by providing the cut-out of the guide wall and the supporting members. Further, the shift lever device housing can be realized at a low cost because it can be manufactured by the same processes as conventional housings.

In the shift lever device housing of the third aspect of the present invention, the sliding cover can be disposed within the housing without the surface being scratched due to contact with a side wall or the like during insertion of the sliding cover.

In the process for mounting the sliding cover, the worker carries out his/her work with the sliding cover supported by the guide wall. Therefore, there is no need for the worker to pay excessive attention to raising the sliding cover or the like, and work efficiency does not deteriorate.

Moreover, the shift lever device housing of the third aspect can be realized merely by providing the cut-out in the guide wall. The shift lever device housing can be realized at a low cost because it can be manufactured by the same processes as conventional housings.

What is claimed is:

1. A shift lever device housing comprising:
   an elongated plate;
   an opening portion in said housing for exposing a portion of said plate;
   a pair of guide rails provided at transverse opposite sides of said opening portion, each guide rail of said pair of guide rails guiding and supporting said plate which is inserted between said pair of guide rails and slid along its longitudinal axis over said opening portion; and
   a guide member provided at a plate insertion side of said opening portion for supporting transverse opposite end portions of said plate when said plate is slid between said pair of guide rails, said opposite end portions of said plate being unexposed by said opening portion after said plate is slid between said rails.

2. A shift lever device housing according to claim 1, wherein said guide member is formed from a cut-out portion of a guide wall as viewed from a plate insertion side of said guide member.

3. A shift lever device housing according to claim 2, wherein said cut-out portion in said guide wall is in a substantial V-shape.

4. A shift lever device housing according to claim 2, wherein said guide member is formed such that an interval between end portions of said cut-out portion is longer than a transverse direction dimension of said plate.

5. A shift lever device housing according to claim 1, wherein said pair of guide rails are formed such that a cross-section of each guide rail of said pair of guide rails as viewed from a longitudinal direction thereof is substantially L-shaped.

6. A shift lever device housing according to claim 1, wherein said opening portion is quadrilateral.

7. A shift lever device housing according to claim 6, wherein said opening portion is rectangular.

8. A shift lever device housing according to claim 1, wherein said plate is an indicator plate.

9. A shift lever device housing according to claim 1, wherein said plate is a sliding cover.

10. A shift lever device housing comprising:
    an indicator plate;
    an opening portion in said housing exposing an indication surface of said indicator plate to an exterior;
    a pair of guide rails provided at transverse opposite sides of said opening portion, each guide rail of said pair of guide rails guiding and supporting said indicator plate which is inserted between said pair of guide rails and slid along its longitudinal axis over said opening portion;
    a stopper provided in the vicinity of an indicator plate insertion side end portion of said opening portion, said stopper, together with said pair of guide rails, retaining said indicator plate;
    a guide wall provided at an indicator plate insertion side of said stopper, said guide wall supporting transverse opposite end portions of said indicator plate that do not include said indication surface of said indicator plate; and
    a supporting member provided between said guide wall and said stopper, said supporting member being provided such that, when said indicator plate is inserted, there exists a gap between said indicator plate and said stopper, said supporting member supporting the transverse opposite end portions of said indicator plate that do not include said indication surface of said indicator plate.

11. A shift lever device housing according to claim 10, wherein said supporting member is a pair of projections provided so as to correspond to the transverse direction end portions of said indicator plate.

12. A shift lever device housing according to claim 11, wherein said pair of projections is provided such that a distance between said projections is smaller than a width of said indicator plate and greater than a width of said indication surface of said indicator plate.

13. A shift lever device housing according to claim 10, wherein said guide wall includes a cut-out as viewed from an indicator plate insertion side of said guide wall.

14. A shift lever device housing according to claim 13, wherein said cut-out is substantially V-shaped.

15. A shift lever device housing according to claim 13, wherein said guide wall is formed such than an interval between end portions of said cut-out is longer than a transverse direction dimension of said indicator plate.

16. A shift lever device housing according to claim 10, wherein a top edge portion of said supporting member is provided at a height which is higher than a line passing through the indicator plate insertion side end portion of said opening portion and a top edge portion of said stopper.

17. A shift lever device housing comprising:

an elongated sliding cover moving together with a shift lever;

an opening portion in said housing exposing a portion of a surface of said sliding cover to an exterior;

a pair of guide rails provided at transverse opposite sides of said opening portion, each guide rail of said pair of guide rails slidably supporting said sliding cover which is inserted between said pair of guide rails and slid along its longitudinal axis over said opening portion; and a guide wall provided at a sliding cover insertion side of said opening portion for supporting transverse opposite end portions of said sliding cover which are unexposed by said opening portion after said cover is inserted between said guide rails.

18. A shift lever device housing according to claim 17, wherein said guide wall is formed such that a portion of said guide wall corresponding to the portion of said surface of said sliding cover is cut-out as viewed from a sliding cover insertion side of said guide wall.

19. A shift lever device housing according to claim 18, wherein said cut-out portion is in a substantial V-shape.

20. A shift lever device housing according to claim 18, wherein said cut-out portion of said guide wall is longer than a transverse direction dimension of said sliding cover.

* * * * *

UNITED STATES PATENT AND TRADEMARK OFFICE
CERTIFICATE OF CORRECTION

PATENT NO. : 5,701,838
DATED : December 30, 1997
INVENTOR(S) : Hideaki Ito and Shigetoshi Tomida It is certified that error appears in the above-indentified patent and that said Letters Patent is hereby corrected as shown below:

On the title page of the patent, Foreign Application Priority Data, please delete "Nov. 11, 1994" and replace it with --Nov. 14, 1994--.

Signed and Sealed this

Twenty-fifth Day of August, 1998

Attest:

BRUCE LEHMAN

*Attesting Officer*  *Commissioner of Patents and Trademarks*